United States Patent

Halls et al.

[11] 4,223,514
[45] Sep. 23, 1980

[54] KNIFE SECTION

[75] Inventors: Lawrence M. Halls, New Holland; Horace G. McCarty, Lancaster, both of Pa.

[73] Assignee: Sperry Corporation, New Holland, Pa.

[21] Appl. No.: 22,241

[22] Filed: Mar. 20, 1979

[51] Int. Cl.³ .......................................... A01D 55/02
[52] U.S. Cl. ....................................... 56/299; 56/303
[58] Field of Search ................................ 56/296–302, 56/303

[56] References Cited

U.S. PATENT DOCUMENTS

| | | | |
|---|---|---|---|
| 13,149 | 6/1855 | Manny | 56/299 |
| 16,442 | 1/1857 | Hubbard | 56/299 |
| 33,680 | 11/1861 | McCormick | 56/299 |
| 103,699 | 5/1870 | Allstatter | 56/303 |
| 552,665 | 1/1896 | Miller | 56/299 |
| 601,447 | 3/1898 | Miller | 56/298 |
| 795,550 | 7/1905 | Schum | 56/299 X |
| 2,217,741 | 10/1940 | Gillette | 56/300 |
| 2,931,159 | 4/1960 | Hill | 56/299 |

FOREIGN PATENT DOCUMENTS 1582404 4/1970 Fed. Rep. of Germany ............. 56/300

Primary Examiner—Robert A. Hafer
Attorney, Agent, or Firm—Larry W. Miller; Frank A. Seemar; Ralph D'Alessandro

[57] ABSTRACT

An improved knife section for reciprocating mower is disclosed wherein the improved knife section is constructed from less material than a standard knife section. The thickness of the improved knife section is made substantially equal to the thickness of the material of a standard knife section by forming convolutions in the body. A reinforcing ridge parallel to the cutting edge further improves the rigidity and strength of the improved knife section. The reinforcing ridge extends rearwardly beyond the cutting edge to encircle the rivet holes to allow for the inclusion of countersunk areas permitting the rivet heads to fit within the plane of the knife section, thereby producing a substantially uniform top surface. An extension of the countersunk area below the bottom surface of the knife section can interfit an embossed depression formed around the rivet hole in the support bar, resulting in an interlock between the knife section and support bar to reduce shearing stresses within the rivet.

16 Claims, 5 Drawing Figures

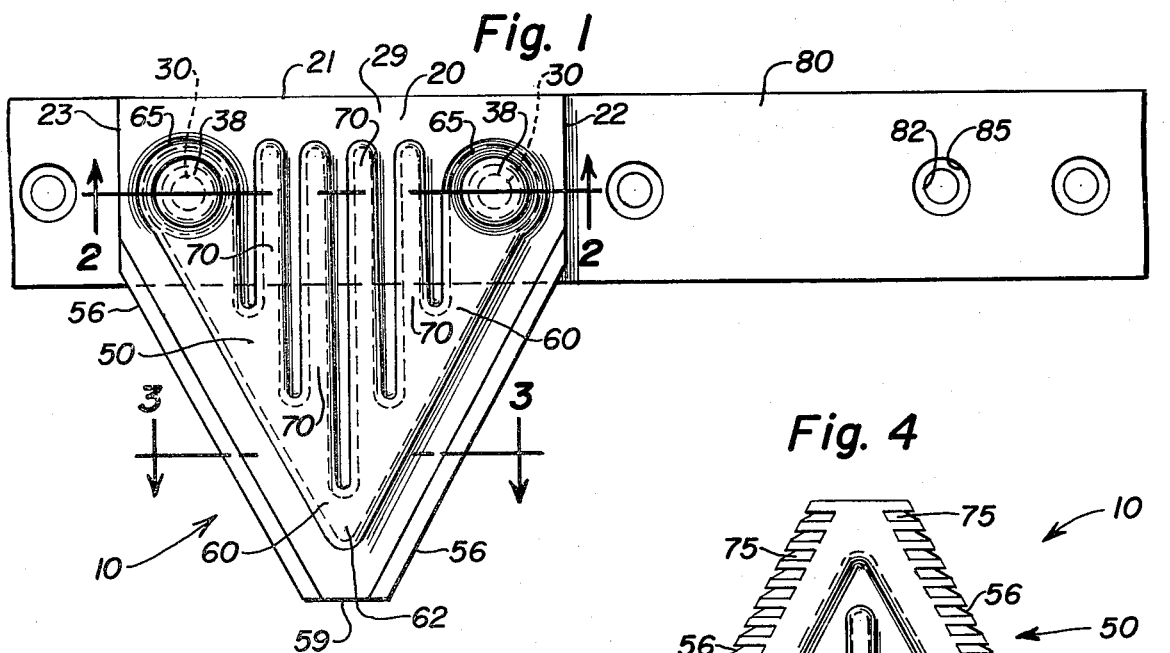
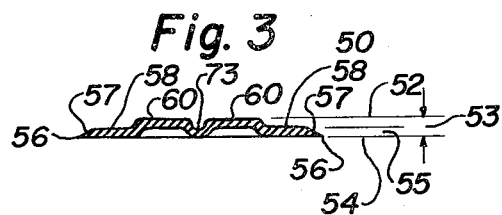
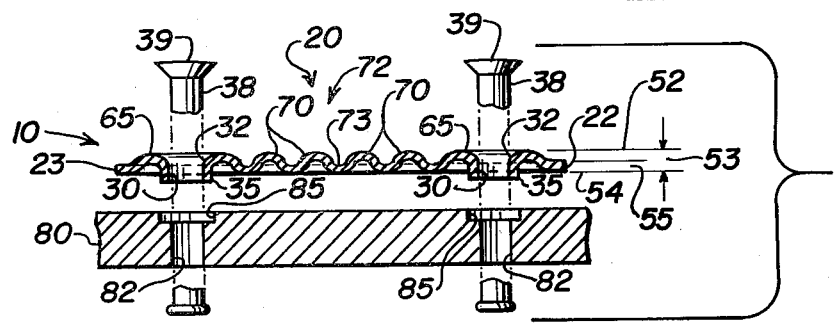
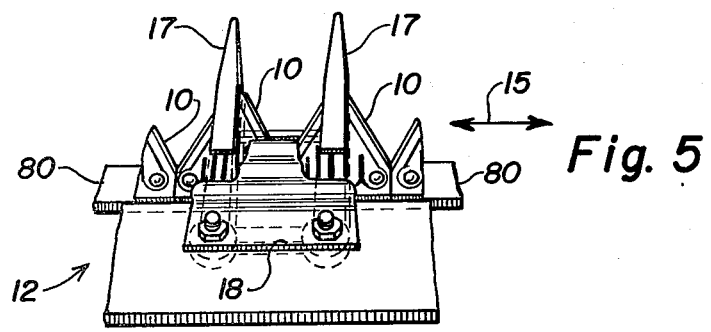

KNIFE SECTION

BACKGROUND OF THE INVENTION

The present invention relates generally to reciprocating mowers and, more particularly, to an improved knife section for inclusion on the cutterbar assembly of reciprocating mowers.

Reciprocating mowers are currently found on many crop harvesting machines to sever the crop from the ground and initiate the harvesting process. For example, reciprocating mowers can be found on mower-conditioners, windrowers and combine equipment. Reciprocating mowers are also commonly utilized independently of other harvesting machines as a mowing device. A reciprocating mower differs from a rotary type of mower in that the former cuts with a shearing action while the latter cuts via an impact action.

The standard knife section utilized in present day reciprocating mowers is generally triangular in shape and possesses a cutting edge on each of two sides. The cutting edges cooperate with shear surfaces on adjacent mower guards to cut crop material via a shearing type of cutting action. Normally, a plurality of knife sections are riveted at the base thereof to a support bar which extends to connect with a drive mechanism to induce a reciprocating linear motion thereto.

With increasing material costs, the manufacturing of a knife section from significantly less material has been found to be increasingly desirable. However, since each individual knife section is independently attached to the support bar and can be replaced if broken, maintaining the identical exterior dimensions, i.e. thickness, length and width, of a standard knife section has been a problem. Making a knife section from less material also creates the disadvantage of reduced strength and rigidity, particularly in light of the high operating speeds and stresses imposed on the modern day knife section.

In addition, the trend in farm machinery today appears to be one of increasing size and to increase the width of cut of a harvesting machine necessitates an increase in the length of the cutterbar. Adding additional knife sections, to increase the length of the cutterbar, increases the mass inertia of the cutterbar assembly, increases the vibrations transmitted to the rest of the harvesting machine and necessitates a higher energy input to operate the cutterbar assembly.

Previous attempts to lighten the weight of a knife section have resulted in knife sections with a thinner center body section, see U.S. Pat. No. 16,442, or no center body section at all, see U.S. Pat. No. 6,903 and U.S. Pat. No. 2,931,159. However, since the high operating speeds and the high stresses placed on present day reciprocating mowers require that strength and rigidity of the knife section be maintained, such weight reducing inventions have been found to be impractical.

R. Allstatter (see U.S. Pat. No. 103,699 granted May 31, 1870) incorporated a V-shaped rib to increase the strength of a thinner knife section. However, the knife sections in Allstatter are not capable of individually replacing standard knife sections since this rib terminates before reaching the rivet holes and the support bar area; either the base portion would be thinner than the standard knife section or the body portion would be much thicker.

SUMMARY OF THE INVENTION

It is an object of this invention to overcome the aforementioned disadvantages of the prior art by providing an improved lighter knife section for a reciprocating mower.

It is another object of this invention to reduce the amount of material required to make a knife section for a reciprocating mower.

It is another object of this invention to decrease the weight of an individual knife section.

It is still another object of this invention to increase the strength and rigidity of a knife section for a reciprocating mower.

It is a feature of this invention to reduce the vibration forces transmitted from the cutterbar assembly of a reciprocating mower to the rest of the crop harvesting machinery.

It is an advantage of this invention that the mass inertia of the cutterbar assembly is reduced.

It is another advantage of this invention that the energy input necessary to operate the cutterbar assembly is also reduced.

It is a further object of this invention to maintain the exterior dimensions of a standard knife section on an improved lighter knife section so that the improved knife section can individually replace a standard knife section on a cutterbar assembly.

It is a still further object of this invention to provide for a knife section design which can be manufactured and utilized simply and inexpensively.

It is another feature of this invention to provide a design for a knife section which would allow the head of a rivet connecting the knife section to the support bar to fit within the plane of the knife section.

It is still another advantage of this invention to reduce stress and loads on rivets connecting the knife section to the support bar.

It is a further advantage of this invention to increase the strength of the area of the rivet hole on a knife section for a reciprocating mower.

These and other objects, features and advantages are accomplished according to the instant invention by providing an improved knife section for a reciprocating mower wherein the improved knife section is constructed from less material than a standard knife section. The thickness of the improved knife section is made substantially equal to the thickness of the material of a standard knife section by forming convolutions in the body. A reinforcing ridge parallel to the cutting edge further improves the rigidity and strength of the improved knife section. The reinforcing ridge extends rearwardly beyond the cutting edge to encircle the rivet holes to allow for the inclusion of countersunk areas which allow the rivet heads to fit within the plane of the knife section, thereby producing a substantially uniform top surface. An extension of the countersunk area below the bottom surface of the knife section can interfit an embossed depression formed around the rivet hole in the support bar, resulting in an interlock between the knife section and the support bar to reduce shearing stresses within the rivet.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a top plan view of an improved knife section and accompanying support bar embodying the teachings of the instant invention;

FIG. 2 is an enlarged exploded cross sectional view of the knife section and support bar shown in FIG. 1 taken along line 2—2;

FIG. 3 is an enlarged cross sectional view of the knife section shown in FIG. 1 taken along line 3—3;

FIG. 4 is a bottom plan view of a knife section incorporating certain modifications according to the teachings of the instant invention; and FIG. 5 is a perspective view of a portion of a cutterbar assembly on a reciprocating mower showing the working environment of the knife section.

DETAILED DESCRIPTION OF THE INVENTION

Referring now to the drawings and particularly to FIG. 1, a top plan view of an improved unitary knife section embodying the teachings of the instant invention can be seen. Reference to a standard knife section indicate the knife sections being used in today's reciprocating mower technology which have substantially identical exterior dimensions. Each of these standard knife sections can individually replace another without affecting the performance efficiency of the reciprocating mower.

The knife section 10 is generally comprised of a base portion 20 and a body portion 50. The base portion 20 is generally rectangular in shape and is defined by the base edge 21, two non-cutting side edges 22, 23 and the body portion 50. The knife section 10 is attached to a support bar 80 by a connecting means 38, such as rivets screws or bolts, inserted through holes 30 in the base portion 20.

The body portion 50 is generally trapezoidal in shape with the base portion 20 being integrally connected at the major base of the trapezoidal figure. Two cutting edges 56 define the forwardly converging sides of the trapezoidal shape, while a blunt tip 59 forms the minor base. This configuration of knife section is commonly referred to as being triangular in shape, for example see U.S. Pat. No. 3,557,538. Whether the body portion 50 is trapezoidal as shown and preferred, or truly triangular is unimportant to the instant invention.

The standard knife section is made from rigid material, usually steel, with a thickness substantially equal to the thickness of the knife section. Since the knife section conforming to the teachings of this disclosure is constructed from a material with a thickness significantly less than a thickness of a standard knife section, it is necessary to solve the problems of not reducing the strength and rigidity of the knife section while increasing the thickness to that of the standard knife section.

In that regard, a reinforcing ridge 60 is formed in the body portion 50 parallel to each cutting edge 56. The two reinforcing ridges 60 converge forwardly and merge at the forward end 62, thereby forming a V-shaped configuration. Each reinforcing ridge 60 extends rearwardly onto the base portion 20 to encircle each hole 30. The portion 65 of the reinforcing ridge 60 encircling each hole 30 improves the strength in this area of the knife section 10 to resist structural failure.

To further improve the strength and rigidity of this thinner knife section, a plurality of ribs 70 are formed in the body portion 50. These ribs 70 are shown in the preferred embodiment as extending perpendicular to the base edge 21. It should be readily understood by one skilled in the art that other rib configurations will be equivalent to that depicted in the preferred embodiment, including, but not necessarily limited to, a V-shaped configuration, either parallel to the reinforcing ridges 60 or inverted with respect thereto.

The ribs 70 extend onto the base portion 20 and terminate on a line corresponding to the portion 65 of the reinforcing ridges 60 rearward of the holes 30 leaving a flat base area 29 between the ribs 70 and the base edge 21. This flat base area 29 aids in maintaining the size of the knife section after the heat treating step of the hereinafter described manufacturing process.

FIG. 1 displays a support bar 80 having only one knife section 10 mounted thereon. One skilled in the art will realize that in normal operating conditions a plurality of knife sections 10 are attached to the support bar 80 in a sequential side-by-side relationship. FIG. 5 shows a portion of a cutterbar assembly 12 of a reciprocating mower incorporating improved knife sections 10 according to the teachings of the instant invention, under normal operating conditions.

Referring now to FIG. 2, an exploded cross sectional view of the knife section shown in FIG. 1 taken along a line through the holes 30 can be seen. The top of the portion 65 of the reinforcing ridge 60 and the top of the rib 70 are in a common plane forming the top surface 52 of the knife section 10. The convoluted shape 72 of the ribs 70 formed into the body portion 50 and extended into the base portion 20 can be seen in FIG. 2.

The thickness 53 of the knife section 10 is the vertical distance between the top surface 52 and the bottom surface 54. As previously noted, the thickness 53 of the improved knife section 10 should be equal to the thickness of a standard knife section to facilitate individual replacement of standard knife sections by improved knife section 10. As can be seen in FIGS. 2 and 3, the thickness 53 remains uniform throughout the body portion 50, the top surface 52 and bottom surface 54 being substantially parallel.

The inclusion of the portion 65 of the reinforcing ridges 60 encircling the holes 30 allows for the incorporation of countersunk areas 32 concentric with the holes 30 that permits the head 39 of the connecting means 38 into the plane of the body portion 50. The absence of the head 39 of the connecting means 38 above the top surface 52 allows the use of flat hold-down clips 18 rather than the commonly used arched clips.

In forming the knife section 10 according to the procedure proposed below, it is possible to form an extension 35 which projects from portion 65 below the plane of the bottom surface 54. This extension 35 would fit within an embossed depression 85 around the hole 82 in the support bar 80 resulting in an interlock between the knife section 10 and the support bar 80 to relieve some of the load, and therefore shearing stresses, within the connecting means 38. Should the extension 35 not be desired, it could be either ground off or initially formed such that it extends only to the plane of the bottom surface 54.

FIG. 3 reveals a cross section through the body portion 50 of the knife section 10. A sloping surface 57 extends downwardly from the body portion 50 to define with the bottom surface thereof the cutting edge 56. The flat planar portion 58 between the sloping surface 57 and the reinforcing ridge 60 provides the capability to subsequently sharpen the cutting edge 56 by grinding the sloping surface 57 without interfering with the reinforcing ridge 60. Part of the convoluted shape 72 seen in FIG. 2 is apparent in FIG. 3 in the form of a trough 73 between the two reinforcing ridges 60.

FIG. 4 exhibits a bottom plan view of a knife section 10 revealing two modifications to the knife section of FIG. 1, the first modification being the inclusion of serrations 75 on the bottom surface 54 of the body portion 50 adjacent the cutting edges 56. The second modification is the inclusion of a tab 25 extending from one non-cutting side 22 of the base portion 20 and a socket 26 of a shape identical to the tab 25 on the opposing non-cutting side 23 of the base portion 20. The tab 25 interlocks with the socket of the adjoining knife section (not shown) to relieve some of the shearing load on the connecting means 38. However, it should be noted that the inclusions of a tab 25 and corresponding socket 26 would prevent a knife section modified in this manner from being capable of individually replacing standard knife sections.

FIG. 5 displays the working environment of a knife section in a perspective view of a portion of a cutterbar assembly 12. A plurality of knife sections 10 are connected to a support bar 80 to travel in the reciprocating linear motion indicated by the double headed arrow 15, the knife sections 10/support bar 80 combination generally forming the cutterbar assembly 12. The knife sections 10 cooperate with the finger guard 17 to create a shearing action which severs the crop being harvested while holddown clips 18 restrict movement of the cutterbar assembly 12 in a vertical plane. One skilled in the art should further realize that varieties of finger guards exist and that this invention is not limited of the type of finger guard being employed to produce the aforementioned shearing action.

Manufacturing knife sections as shown in the drawings can be accomplished in an automatic continuous strip type of process using material 1/16 of an inch thick instead of the standard ⅛ of an inch. The thickness of the material is indicated by the number 55 in FIG. 2 and FIG. 3. The thickness 53 of the knife section 10 is significantly greater than the thickness 55 of the material from which the knife section 10 is made. The forming of the specific shape can be done in a series of steps starting with punching out the blanks, then forming the ribs and reinforcing ridges and finally pinching off the cutting edges to form the sloping surface and possibly include serrations, if desired. This entire process could be performed by a stamping or pressing action, although heating the metal is occasionally helpful, especially in the pinching off of the cutting edges.

The holes should be pierced and extruded, rather than punched out, to give the proper shape and structure disclosed herein with respect to the countersunk areas and extension projecting below the bottom surface to interlock with the support bar provided that such structural features are preferred. Each knife section should be through-hardened by heat treating for uniform strength. The last step may include a light grind on the cutting edge to remove any excess material, depending on the edge shape after the pinch off step, and to ensure a proper cutting edge.

It will be understood that various changes in the details, materials, steps and arrangements of parts which have been described and illustrated in order to explain the nature of the invention will occur to and may be made by those skilled in the art upon a reading of the disclosure within the principles and the scope of the invention.

Having thus described the invention, what is claimed is:

1. In a knife section for a reciprocating mower having a substantially rectangular base portion defined by a base edge and two opposing non-cutting side edges, said base portion having two spaced apart holes therethrough; an upper surface; an opposing lower surface substantially parallel to said upper surface, said lower surface defining a lowermost plane; and a generally triangularly shaped body portion integral with said base portion, including two converging cutting edges extending, respectively, from said two non-cutting side edges, said body portion being defined at the base thereof by said base portion and defined at the sides thereof by said cutting edges, the improvement comprising:
   a reinforcing ridge parallel to each said cutting edge, said reinforcing ridges partially defining an elevated plane above and parallel to said upper surface, each said reinforcing ridge continuing onto said base portion to encompass the respective said hole; and
   a plurality of rounded ribs projecting from said lowermost plane substantially to said elevated plane, said ribs extending from said body portion onto said base portion.

2. The knife section of claim 1 wherein said ribs terminate between said base edge and a line projected through said holes.

3. The knife section of claim 2 wherein said ribs are perpendicular to said base edge and extend to said reinforcing ridges.

4. The knife section of claim 3 wherein each said reinforcing ridge includes a countersunk area concentric with the respective said hole.

5. The knife section of claim 4 wherein said base portion includes a circumference being defined by the base portion surrounding each said hole, said base portion further including a ring-like projection corresponding to said circumference of each said hole and extending therefrom below said lower surface.

6. The knife section of claim 5 wherein said lower surface includes a plurality of serrations adjacent said cutting edges.

7. The knife section of claim 6 wherein said base portion further has a tab-like projection extending laterally from one said non-cutting side edge and a tab-like indentation corresponding to said tab-like projection on the opposing non-cutting side edge, such that the tab-like projection of one knife section would interlock with the tab-like indentation of an adjoining knife section.

8. The knife section of claim 7 wherein said elevated plane and said lowermost plane are approximately ⅛ of an inch apart.

9. An improved knife section for a reciprocating mower comprising:
   a base portion having two spaced apart holes therethrough, said base portion being generally defined by a base edge and two opposing non-cutting side edges;
   a body portion integral with said base portion, said body portion terminating in two opposing converging cutting edges extending from, respectively, said two opposing non-cutting side edges of said base portion;
   an integrally formed reinforcing ridge extending along said body portion substantially parallel to each of said cutting edges and encompassing each of said holes; and a plurality of side-by-side ribs integrally formed in both said body portion and said base portion in the area between said base edge and said reinforcing ridge.

10. The knife section of claim 9 wherein said reinforcing ridge includes a countersunk area concentric with each said respective hole.

11. The knife section of claim 9 wherein said ribs extend onto said base portion and are substantially coextensive with said reinforcing ridges.

12. The knife section of claim 11 wherein said ribs are perpendicular to said base edge and extend to interconnect with said reinforcing ridges.

13. The knife section of claim 12 wherein said body portion is serrated, said serrations extending to each said cutting edge.

14. The knife section of claim 13 wherein each said hole includes a circumference being defined by the base portion surrounding each said hole, said base portion including a ring-like projection corresponding to the circumference of each said hole.

15. The knife section of claim 11 wherein said base portion further has a tab-like projection extending laterally from one said non-cutting side edge and a tab-like indentation corresponding to said tab-like projection on the opposing non-cutting side edge, such that the tab-like projection of one knife section would interlock with the tab-like identation of an adjoining knife section.

16. An improved cutterbar assembly adapted to be operably connected to the drive mechanism of a reciprocating mower comprising:

(A) an elongate, generally rectangularly shaped support bar, said support bar having:
  (1) a plurality of spaced apart openings therethrough; and
  (2) a depression therein corresponding to each said opening, each said depression being concentric with each respective said opening; and
(B) a plurality of knife sections affixed to said support bar in a side-by-side relationship along the length thereof, each said knife section including:
  (1) a base portion having two spaced apart holes therethrough, said base portion being generally defined by a base edge and two opposing non-cutting side edges, each of said holes corresponding to one of said openings;
  (2) a body portion integral with said base portion defined by said base portion and two converging cutting edges extending from, respectively, said two opposing non-cutting side edges of said base portion;
  (3) an integrally formed reinforcing ridge extending along said body portion substantially parallel to each of said cutting edges and encompassing each of said holes;
  (4) a plurality of side-by-side ribs integrally formed in the area between said base edge and said reinforcing ridge;
  (5) a projection extending from the base portion surrounding each said hole, said projection interengaging with the respective said depression; and
  (6) connecting means cooperating with each said hole and corresponding opening for affixing said knife sections to said support bar.

* * * * *